UNITED STATES PATENT OFFICE.

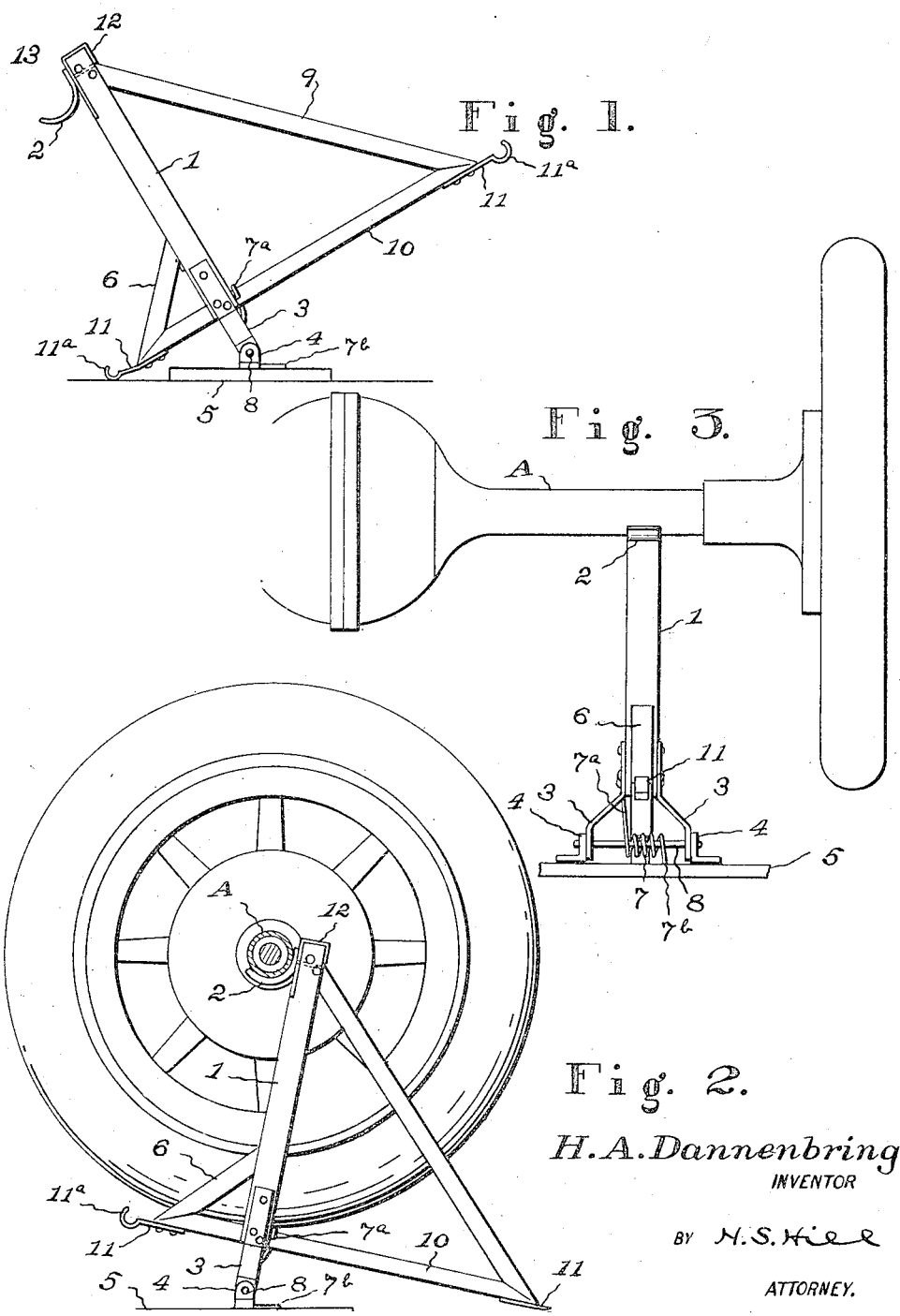

HENRY A. DANNENBRING, OF CLAYTON, SOUTH DAKOTA.

AUTOMOBILE-JACK.

1,288,846.      Specification of Letters Patent.      Patented Dec. 24, 1918.

Application filed May 6, 1918. Serial No. 232,892.

*To all whom it may concern:*

Be it known that I, HENRY A. DANNENBRING, a citizen of the United States, residing at Clayton, in the county of Hutchinson, State of South Dakota, have invented a new and useful Automobile-Jack; and I do hereby declare the following to be a full, clear, and exact description of the invention, such as will enable others skilled in the art to which it appertains to make and use the same.

The present invention relates to a rear end jack and stop for automobiles, and has for its object to provide a device of this character which is adapted to be placed at the back of a garage and embodies novel features of construction whereby it will engage the rear axle housing of an automobile and lift the rear end of the automobile above the floor of the garage when the automobile is backed against the same. The drive wheels of the automobile being thus lifted above the floor there is no danger of the vehicle being accidentally backed through the walls of the garage by an inexperienced driver, and the wheels are supported above the floor when the vehicle is not in use, thereby resulting in a great saving in tires.

Further objects of the invention are to provide a rear end jack and stop of this character which is comparatively simple and inexpensive in its construction, which can be adjusted to receive the rear axle housing of any size or make of automobile, which automatically swings itself into position for engagement with the rear end of an automobile, which operates without any undue shocks and jars, and which provides a most effective means for starting the engine when it is again desired to use the motor vehicle.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a rear end automobile jack and stop constructed in accordance with the invention, showing the same as swung forwardly into position to engage the rear axle housing of an automobile.

Fig. 2 is a similar view showing the device as swung rearwardly into operative position to lift the rear end of an automobile which has been backed against the same and hold the drive wheels of the automobile elevated above the floor of the garage.

Fig. 3 is a front elevation of the jack when in operative position as indicated by Fig. 2.

Corresponding and like parts are referred to in the following description and indicated in all the views of the drawings by the same reference characters.

The drawings illustrate one of a pair of devices which are intended to be permanently mounted at the back of a garage or other shelter into which a motor vehicle may be backed for the purpose of housing the same, said devices being properly spaced so as to engage opposite ends of the rear axle housing of the vehicle. Each of the devices includes a swinging jack arm 1 which is pivoted at its lower end and provided at its upper end with a forwardly projecting axle supporting member such as the hooked bracket 2. In the present instance the lower end of the jack arm 1 is shown as provided upon opposite sides thereof with diverging and downwardly extending legs 3 which are pivotally connected to a pair of ears 4 upon a base plate 5. The jack arm is thus mounted in such a manner as to swing forwardly and rearwardly in a vertical plane, although it is held against lateral movement.

The forward swinging movement of the jack arm is limited by a comparatively short stop arm 6 which is inclined forwardly and downwardly and projects from the lower end portion of the arm 1. This forwardly projecting stop arm 6 is of a proper length to engage the floor of the garage when the forward swinging movement of the jack arm 1 has lowered the hooked axle housing support 2 into proper position for engagement with the rear axle housing of the particular automobile which is housed within the garage. A spring 7 normally tends to swing the jack arm forwardly into this position, and in the present instance this spring is shown as coiled around the rod 8 which pivotally connects the legs 3 and ears 4, one end 7ᵃ of the spring being carried upwardly and operatively engaging the jack structure, while the other end 7ᵇ thereof engages the base plate 5. It will thus be obvious that the tension of the spring 7 normally tends to swing the jack arm 1 forwardly to hold the same in proper position for engagement with the automobile when the latter is backed into the garage. The rearward swinging movement of the jack arm 1 is limited by a stop arm 9 which is inclined downwardly and rearwardly from the upper end thereof, the lower end of the said arm 9 being connected to the lower end of the arm 6 by means of a transverse brace 10 which may also be secured to the lower end of the jack arm 1, and is shown as arranged at substantially right angles thereto. When the jack arm 1 has been swung rearwardly to a point slightly beyond a vertical position the stop arm 9 prevents further movement thereof, thereby supporting the rear end of the vehicle in an elevated position with the drive wheels thereof lifted above the floor of the garage, as indicated by Fig. 2. It is thus impossible to back the vehicle through the walls of the garage, since the drive wheels lose their traction and spin as soon as they are lifted above the floor. Furthermore, the life of the tires will be prolonged when they are thus held out of engagement with the garage floor while the vehicle is not in use. When it is desired to use the vehicle, if there is any difficulty encountered in starting the engine, it is merely necessary to put the engine in gear with the rear wheels and then shove the vehicle forwardly a sufficient amount to move the weight supported by the jack arms 1 slightly above the dead center position. The vehicle will then be moved forwardly as it is lowered and the momentum of the movement thereof will be sufficient to carry it for a short distance after it reaches the floor of the garage. This will result in turning over and starting the engine if proper adjustment has been made, and all difficulty in starting the engine will thus be avoided.

If desired, buffer springs 11 may be arranged at the ends of the prop arms 6 and 9 so as to provide for a yielding contact with the floor of the garage as the jack arm is swung back and forth and avoid all unnecessary shocks and jars. In the present instance these buffer springs 11 are in the form of spring strips which are secured to the ends of the brace 10 and extend beyond the extremities thereof, terminating in rounded noses 11ᵃ which are adapted to engage the garage floor. The hooked arm 2 for engaging the axle housing is preferably adjustable so that it can be raised and lowered upon the jack arm and properly positioned for direct engagement with the rear axle housing of any particular kind of a vehicle. A hooked plate 12 is shown as fitted upon the upper end of the arm 1, said plate being let into the front of the arm and being provided with a series of openings any selected one of which can be engaged by the bolt 13 which secures the member 2 in position. The axle housing support 2 is thus connected to the plate 12 and the latter hooked over the upper end of the jack arm 1 so that the weight of the vehicle is transmitted through the hooked plate to the top of the jack arm, thereby providing a strong construction which will not break or pull out of position. The two units of this rear end automobile jack and stop are always held in proper position to receive the automobile by the action of the spring 7, and when the automobile is backed against the same the rear end thereof is swung upwardly and held in an elevated position. The drive wheels of the vehicle can spin freely so that there is no traction and it is impossible for an inexperienced driver to back the vehicle through the walls of the garage.

Having thus described the invention, what I claim as new and desire to secure by Letters Patent, is:—

1. A rear end automobile jack and stop including a jack arm pivotally mounted at its lower end, an axle support at the swinging upper end of the jack arm, stop members projecting forwardly and rearwardly from the jack arm for engagement with the floor to limit the swinging movements thereof, spring strips projecting from the ends of the stop arms and forming buffers, and yielding means normally swinging the jack arm forwardly to hold the axle support in position for engagement with the axle of a vehicle which is moved against the same.

2. A rear end automobile jack and stop including a base plate, a swinging jack arm provided at its lower end with spaced legs which have a pivotal connection with the base plate, an axle support at the upper end of the jack arm, stop arms inclined downwardly from the front and rear of the jack arm, a brace member arranged at substantially right angles to the jack arm and extending under the same, said brace member being rigidly connected to the stop arms, spring strips secured to the ends of the brace member and formed with rounded noses which project beyond the same and form buffers, and yielding means normally swinging the jack arm forwardly into position to engage the axle of a vehicle which is moved against the same.

3. A rear end automobile jack and stop, including a swinging jack arm pivotally mounted at its lower end, a hooked plate fitted over the upper end of the jack arm and straddling the same, an axle supporting arm projecting laterally from one of the sides of the hooked plate and adjustably connected thereto, stop arms projecting forwardly and rearwardly from the jack arm for limiting the swinging movements thereof, and yielding means normally tending to swing the jack arm forwardly to hold the axle support in position to engage the axle of the vehicle which is moved against the same.

In testimony whereof I have signed my name to this specification in the presence of two subscribing witnesses.

HENRY A. DANNENBRING.

Witnesses:
ALBERT JUNGMANN,
CHRISTIAN HEER.

Copies of this patent may be obtained for five cents each, by addressing the "Commissioner of Patents, Washington, D. C."